United States Patent
Domrose (10) Patent No.: US 11,458,540 B2
(45) Date of Patent: Oct. 4, 2022

(54) DEVICE, METHOD AND CONTROL UNIT FOR THE GENERATIVE PRODUCTION OF A THREE-DIMENSIONAL OBJECT

(71) Applicant: EOS GmbH Electro Optical Systems, Krailling (DE)

(72) Inventor: Robert Achim Domrose, Germering (DE)

(73) Assignee: EOS GmbH Electro Optical Systems, Krailling (DE)

( * ) Notice: Subject to any disclaimer, the term of this patent is extended or adjusted under 35 U.S.C. 154(b) by 378 days.

(21) Appl. No.: 15/558,131

(22) PCT Filed: Apr. 8, 2016

(86) PCT No.: PCT/EP2016/057694
§ 371 (c)(1),
(2) Date: Sep. 13, 2017

(87) PCT Pub. No.: WO2016/169784
PCT Pub. Date: Oct. 27, 2016

(65) Prior Publication Data
US 2018/0043432 A1 Feb. 15, 2018

(30) Foreign Application Priority Data
Apr. 21, 2015 (DE) .......... 102015207254.1

(51) Int. Cl.
*B22F 10/20* (2021.01)
*B33Y 50/02* (2015.01)
(Continued)

(52) U.S. Cl.
CPC ............ *B22F 10/20* (2021.01); *B29C 64/153* (2017.08); *B33Y 10/00* (2014.12); *B33Y 50/02* (2014.12); *B22F 10/30* (2021.01); *Y02P 10/25* (2015.11)

(58) Field of Classification Search
CPC .......... B22F 3/1055; B22F 2003/1057; B29C 64/153; B33Y 10/00; B33Y 50/02; Y02P 10/295
See application file for complete search history.

(56) References Cited

U.S. PATENT DOCUMENTS

| 5,730,925 A | 3/1998 | Mattes et al. |
| 6,583,379 B1 | 6/2003 | Meiners et al. |

(Continued)

FOREIGN PATENT DOCUMENTS

| CN | 102001123 | 4/2011 |
| DE | 19514740 | 4/1996 |

(Continued)

OTHER PUBLICATIONS

Hartmann et al., Anforderungen und Randbedingungen für den Einsalz optischer Messsysteme zur In-Line-Prüfung additiv gefertigter Bauteile, RTejournal-Forum für Rapid Technologie, 9(1), 2012 (17 pages) (German) with English abstract (1 page).

(Continued)

*Primary Examiner* — John A Hevey
(74) *Attorney, Agent, or Firm* — Seyfarth Shaw LLP (57) ABSTRACT

The present invention relates to a method for the production of a three-dimensional object (2) by way of layered solidification of a powder construction material (11) by way of electromagnetic radiation, in particular laser radiation, having the steps: scanning points, which correspond to a cross section of the object (2) to be produced, of an applied layer of the powder construction material (11) with an electromagnetic beam (22) from a radiation source (21) for purposes of selectively solidifying the powder construction material (11), conducting a gas flow (33) across the applied layer during the scanning with the electromagnetic beam (22) and performing an irregularity determination with regard to the presence of a process irregularity with regard (Continued)

to at least one process parameter during the production, wherein during the scanning by way of the electromagnetic beam (22), the scanning process at least one present point of the cross section to be solidified is interrupted on the basis of a result of the irregularity determination.

16 Claims, 4 Drawing Sheets

(51) Int. Cl.
*B29C 64/153* (2017.01)
*B33Y 10/00* (2015.01)
*B22F 10/30* (2021.01)

(56) References Cited

U.S. PATENT DOCUMENTS

| | | | |
|---|---|---|---|
| 9,884,318 B2 | 2/2018 | Tow | |
| 2008/0241392 A1 | 10/2008 | Dimter et al. | |
| 2010/0270708 A1* | 10/2010 | Jonasson | B22F 3/1055 264/401 |
| 2011/0054663 A1 | 3/2011 | Matsui et al. | |
| 2012/0126457 A1* | 5/2012 | Abe | B33Y 50/02 264/460 |
| 2014/0265046 A1* | 9/2014 | Burris | B23K 26/034 264/497 |
| 2015/0321422 A1* | 11/2015 | Boyer | B22F 3/1055 264/497 |
| 2016/0114432 A1* | 4/2016 | Ferrar | B23K 26/082 219/76.12 |
| 2016/0279706 A1 | 9/2016 | Domrose et al. | |

FOREIGN PATENT DOCUMENTS

| | | | |
|---|---|---|---|
| DE | 19853947 | 2/2000 | |
| DE | 102007014683 | 10/2008 | |
| DE | 102013205724 | 10/2014 | |
| DE | 102013214320 | 1/2015 | |
| WO | 1992008592 | 5/1992 | |
| WO | WO-9208592 A1 * | 5/1992 | ............ B29C 67/04 |
| WO | 2015040433 | 3/2015 | |

OTHER PUBLICATIONS

Ning et al., An Approach to Minimize Build Errors in Direct Metal Laser Sintering, IEEE Transactions on Automation Science and Engineering, 3(1), 2006, pp. 73-80 (English).

* cited by examiner

DEVICE, METHOD AND CONTROL UNIT FOR THE GENERATIVE PRODUCTION OF A THREE-DIMENSIONAL OBJECT

TECHNICAL FIELD OF THE INVENTION

The present invention refers to a device and a method for a layer-wise construction of three-dimensional objects by means of a generative production, also called "additive manufacturing". In particular, the invention refers to generative production processes, in which a three-dimensional object is generated layer-wise from a metallic construction material in powder form.

BACKGROUND OF THE INVENTION

The mentioned methods are also designated as "selective laser sintering", "selective laser melting", "direct metal laser sintering (DMLS)", "rapid prototyping", "rapid tooling" or "rapid manufacturing" depending on the specific embodiment. A device for carrying out such a method is described for example in document DE 195 14 740 C1. According to this document at first a thin layer of the building material in powder form is applied by means of a recoater and this building material subsequently is solidified by means of the action of a laser beam at positions corresponding to the respective cross-section of the object. The two last-mentioned steps are alternatingly repeated until the three-dimensional object to be manufactured has been completed.

It may be of advantage for the mechanical properties of the objects to be manufactured, when the laser beam scans the positions to be solidified in an applied powder layer area by area. For example, DE 10 2007 014 683 A1 describes a method, in which the area of the layer to be scanned with the laser beam is divided into long stripe regions, wherein the individual stripe regions are exposed by scanning the same with the laser beam in a direction that is transverse to a longitudinal direction of the stripe regions.

When the laser beam acts on the respectively used material, in particular when it is a binderless and fluxless metallic powder material, often splashes (scatters), smoke and vapors may be created that propagate into the building space. The cause of this is for example the formation of gas in the material melt created by the laser, which gas escapes from the material melt when the material melt cools down. In order to avoid a deposition of contaminations such as splashes, smoke and vapors on a coupling window for the laser beam, DE 198 53 947 A1 suggests a processing space, in which a protective gas inlet and a protective gas outlet are arranged at two opposite ends, so that a directed flow of protective gas may be directed through the process chamber. By such protective gas flow the contaminations are removed from the process chamber.

Furthermore, it is known in the prior art to use a protective gas flow for making a surface temperature of the powder layer more uniform in order to have processing conditions that are more homogenous, see WO 92/08592 A in this respect.

In the prior art splashes, smoke and vapors are considered as problem in particular because contaminations may be deposited on surfaces in the process chamber or on the powder layer to be solidified. Besides that, smoke and vapors above the powder layer to be solidified may interfere with the laser beam and thereby may influence the melting process of the material by means of the laser beam. For example, a portion of the laser beam energy to be input may be absorbed above of the powder layer and the laser light will be scattered at the smoke, respectively. For example, the inventor could observe that a region that was exposed with the laser after cooling down had a higher roughness when smoke was present compared to other regions, where less smoke was present when they were exposed. Thus, the properties of the object to be manufactured are affected and as the case may be even harmed by the presence of smoke and vapors in the gas environment above of the currently exposed area.

The protective gas flow for removing smoke and vapors as it is already applied in the prior art, however, is not able to completely prevent an adverse effect on the laser beam by smoke and vapors, as experiments carried out by the inventors have shown:

For an effective removal of smoke it is basically desirable to have a flow velocity of the protective gas as high as possible. However, a flow velocity that is too high results in a blowing of the powder. Therefore, in practice always an appropriate compromise has to be found when the flow velocity is determined. Thus, the flow velocity that can be used, is limited. Typically, values for the flow velocity on the build area are at 1 to 3 m/s.

At present, the velocity with which the laser beam usually is moved lies at 1 to 3 m/s or even higher. If in the most unfavorable case the direction of the gas flow and the scanning direction of the laser beam are the same, it may happen that the laser always has to penetrate the cloud of smoke generated by itself and so to say moves together with this cloud of smoke.

Furthermore, turbulences may occur in the protective gas flow. Small vortexes may form at nozzle outlets, but also at contours and edges inside of the manufacturing device. These vortexes are not necessarily stationary, but may move across the build area together with the protective gas flow. It was observed that certain regions of the build area may be affected more by the formation of vortexes than other regions. This means, in these regions the probability of coming across a vortex is higher than at other positions of the build area. Vortexes in the protective gas flow are disadvantageous because by these vortexes smoke and vapors that have already been removed from the interaction region of the laser beam could be conveyed back into the region of interaction.

SUMMARY OF THE INVENTION

In view of the above problems it is an object of the invention to provide an improved device and an improved method and a correspondingly designed control unit, respectively, for the layer-wise additive manufacturing of three-dimensional objects. Here, an improvement is particularly preferably regarded to be an improvement of the part properties of the manufactured three-dimensional objects. Specifically, an improvement of these part properties refers to a part quality possibly throughout the whole part, which means also in regions that in the prior art would potentially be affected by the above described negative effects due to splashes, smoke, vapors or the like.

The object is achieved by a method according to claim 1 and a device according to claim 13 as well as by a control unit according to claim 14.

According to the invention a method of manufacturing a three-dimensional object by means of a layer-wise solidification of a building material in powder form by means of electromagnetic radiation, in particular laser radiation comprises accordingly the steps:

scanning positions of an applied layer of the building material in powder form that correspond to a cross-section of the object to be manufactured by means of an electromagnetic beam from a radiation source in order to selectively solidify the building material in powder form, passing a gas flow over the applied layer during the scanning with the electromagnetic beam and irregularity determination of the existence of a process irregularity with respect to at least one process parameter in the manufacture.

wherein during the scanning with the electromagnetic beam the scanning process is interrupted at least one current position of the cross-section to be solidified based on a result of the irregularity determination.

Here, during the scanning with the electromagnetic beam the scanning process is interrupted at least one current position of the cross-section to be solidified based on a result of the irregularity detection.

Thus, the invention makes a point of determining a process irregularity in the manufacture, in particular during the scanning process, and of interrupting the scanning process based on the result of the determination. Examples for process irregularities are in particular the following:

The occurrence or the increased occurrence of particles such as splashes (scatters), smoke, vapors or the like.

A change of the emission of radiation from the position of interaction of the electromagnetic beam on the building material during the scanning, from which change of the emission for example an overheating of the building material may be derived; the emitted radiation may be e.g. visible light; a changed emission of radiation can e.g. become noticeable by a change of the spectral composition and/or intensity fluctuations of the emitted radiation.

A high surface roughness of an already solidified portion of the object to be manufactured.

Other measurement results and prediction results, respectively, that indicate an increased probability for defects in the material structure of the object to be manufactured.

In other words, the invention aims at using process irregularities, which up to now have been considered to be merely perturbations, as indicators for the quality of the manufacturing process, based on which indicators the manufacturing process is controlled and regulated, respectively.

The irregularity determination can be implemented using technical measuring equipment, e.g. by means of optical sensors. Here, one or more process parameters are determined using technical measuring equipment such as sensors during the ongoing manufacturing process, thus in particular during the scanning of a layer of the building material. Here, only by way of example the properties of the radiation emitted from the place of interaction of the electromagnetic beam on the building material, the number and size of splashes, the density of smoke or the density of vapors above the place of interaction or temperature fluctuations in the layer are mentioned as process parameters. Alternatively or in addition, the irregularity determination may also be based on a predicative systematics, meaning a prediction functionality that for example based (only) on empirical raw data and/or based on measurement output values predicts the occurrence of a process irregularity during the manufacturing process. Such empirical measurement output values can for example be determined in advance in a representative series of measurements and be recorded in a measurement database. Raw data, however, are preferably such data that do not result from specific measurements, but were collected as a kind of "byproducts" of a manufacturing process (or several of such manufacturing processes) that was previously carried out and is representative for a concrete method carried out according to the invention. In this way, current process irregularities can be determined and/or future process irregularities can be predicted, also for example using statements on probabilities of their actual occurrence.

The term "current process irregularity" designates here a process irregularity occurring during an ongoing manufacturing process, thus in particular during the scanning of a layer of the building material. When it is referred to an interruption of the scanning process at a current position of the cross-section to be solidified, this means a position of the cross-section to be solidified, at which the place of interaction of the electromagnetic beam used for the solidification is actually located at the time of the interruption. The interruption of the scanning based on the result of the irregularity determination can be carried out immediately after the occurrence (or predicted occurrence) of the existence of a process irregularity and/or can be carried out with a time delay afterwards. In case an interruption is based on an only predicted occurrence of a process irregularity, alternatively and/or additionally an interruption may be implemented with a time shift before the predicted occurrence of the process irregularity. In other words, apart from an information on the type (and as the case may be the probability) of a process irregularity, the irregularity determination also provides a time specification, when the process irregularity will (presumably) occur. Then, the interruption of the scanning can be inserted depending on this time specification.

By means of the method according to the invention it is possible to temporally affect the scanning process such that possible or actual perturbations that are directly or indirectly related to a process irregularity can be considerably reduced or even be eliminated. In the end, this raises the part quality of the object to be manufactured.

The method according to the invention is exclusively suited for the manufacturing of three-dimensional objects by means of solidifying a building material in powder form with the help of electromagnetic radiation, in particular laser radiation. In particular, it is suited for methods in which the above-mentioned protective gas flow is applied. Namely, often only such a gas flow provides the precondition for an abating of the process irregularities within a short time after an interruption of the scanning occurred.

Furthermore, the invention differs from a termination of the scanning process for a longer time (within a range longer than one minute) in the sense of a kind of "emergency termination". Rather, the invention is based on the approach of substantially continuing the manufacturing process as planned and interrupting it only for a short time, in particular in the meaning of the interruption periods specified further below, however, not terminating it. Thus, the manufacturing process is an abortion-free manufacturing process.

According to the invention, a device for manufacturing a three-dimensional object by means of a layer-wise solidification of a building material in powder form by electromagnetic radiation, in particular laser radiation, accordingly comprises:

a scanning unit for scanning positions of an applied layer of the building material in powder form corresponding to a cross-section of the object to be manufactured with an electromagnetic beam from a radiation source in order to selectively solidify the building material in powder form, a gas flow channeling unit designed to pass a gas flow over the applied layer during the scanning with the electromagnetic beam and an irregularity determination unit that when being operated carries out an irregularity determination of the presence of a process irregularity with respect to at least one process parameter in the manufacture, wherein the device is designed such that it interrupts the scanning operation at least one current position of the cross-section to be solidified during the scanning with the electromagnetic beam based on a result of the irregularity determination.

In particular, a control unit according to the invention can be used for carrying out the method according to the invention, which control unit is designed such that a device according to the invention may be equipped and/or retrofitted with it and which control unit is designed such that it interrupts the scanning operation during the scanning with the electromagnetic beam at least one current position of the cross-section to be solidified based on a result of the irregularity determination.

According to the invention, the device and the control unit can be controlled by a computer program that is able to be loaded into a programmable control unit and has program code means for carrying out all steps of a method according to the invention, when the computer program is executed in the control unit.

Further developments of the invention are specified in the dependent claims. Here, features from the dependent claims and from the following description related to the method may also be used for a further development of the device and the control unit, respectively, or vice versa, except this is explicitly excluded.

Preferably, the electromagnetic beam is interrupted for a time period of at most 70 ms, preferably at most 50 ms, particularly preferably at most 30 ms and very particularly preferably at most 8 ms. As is explained in more detail below in the context of the description of the figures, the inventor has found that these values are time periods within which negative effects due to a process irregularity can be sufficiently smoothed out temporally. Ideally, the time period of the interruption will be chosen depending on the process irregularity.

On the other hand, preferably, the electromagnetic beam is interrupted for a time period of at least 1 ms, preferably at least 2 ms, particularly preferably at least 10 ms. Also these values can be chosen depending on the type of process irregularity as will be explained further below.

Furthermore, it has proven to beneficial, when the region corresponding to the cross-section of the object to be manufactured is divided into sections and is scanned section by section with the electromagnetic beam, wherein the electromagnetic beam in at least one section is moved along vectors, in particular vectors that are in parallel to each other, and the electromagnetic beam is interrupted between the scanning of two neighboring vectors, preferably at a reversal point between two neighboring vectors.

The interruption specifically between the exposure of two of such vectors e.g. in the context of a so-called "hatch exposure" has the advantage that one vector is still scanned to its end and the scanning of the next vector is not yet started. Thus, at such spatial position there is a considerably good point in time for the interruption according to the invention.

It can also be advantageous in terms of saving time, when during the interruption the electromagnetic beam carries out a scanning operation at another position than the current position. Here, the current position is the position at which the electromagnetic beam acted on the layer immediately before the start of the interruption, which position is at least potentially affected by the process irregularity. The other position preferably has such a distance to the current position that it is as certain as possible that the other position is not affected by the process irregularity. Such other position can be at another location in the object cross-section currently to be solidified in the layer, for example it may also be located in a region, in which the cross-section of another object is to be solidified in the layer. In this respect it shall be emphasized that in a laser sintering method or laser melting method on which this application is based, it is irrelevant whether only one object or several objects in parallel are manufactured in the building space. Thus, when in the present application the manufacturing of one object is mentioned, this implicitly also means that the manufacturing of further objects in parallel in the same manufacturing process as the one of the one object shall not be excluded.

After the interruption has finished, the electromagnetic beam preferably is directed to the position immediately adjacent to the current position, at which current position the interruption was initiated. "Immediately adjacent to the current position" means in particular that the interaction region of the electromagnetic beam at this position in the building material in powder form reaches to the boundary of the current position, such that for example by the interaction of the electromagnetic beam at the position immediately adjacent, a melting process and/or a significant heating at the current position are co-effected. Thereby it is ensured that the (potential) process irregularity with a high probability has no appreciable effect on the manufacturing process at the current position after the interruption has been terminated.

Preferably, the interruption is triggered depending on information derived from the process irregularity, in particular the interruption is time-controlled depending on information derived from the process irregularity. The corresponding information comprises for example the significance and/or the location of the process irregularity.

According to an embodiment of the method according to the invention, the irregularity determination includes a detection of an optical emission behavior of respective scanned positions of the layer of the building material in powder form during the scanning with the electromagnetic beam and in which it is determined that a process irregularity exists, when a significant change of the optical emission behavior is recorded. In particular, the significant change of the optical emission characteristics may be recorded as being significant, when a significant change of a process parameter value is recorded, which process parameter value represents a spectral composition and/or an intensity of a radiation (e.g. visible light) that is emitted from a scanned position. As already mentioned, the underlying process parameters here may be for example a spectral and/or intensity composition and/or a spectrally weighted intensity (from the spectral composition accumulated over the time) and/or a behavior of the intensity with time. The above-mentioned significant change and significant variation, respectively, in general the existence of a significance, are preferably detected based on threshold values, so that the existence of a significance is determined to be an excess or an under-run of a threshold value that has been determined in advance. Preferably such a threshold value is a deviation from a previously defined normal value or spectrum of a normal value of the underlying parameter by at least 10%, particularly preferably by at least 20%, specifically preferably by at least 40%.

Thereby, based on the inventor's analysis reliable results of the determination may be obtained.

In particular in the context of the above-mentioned vector-based scanning it turned out to be advantageous, when the electromagnetic beam is interrupted several times during the scanning of a section. These interruptions then can be particularly short and targeted.

In the same context (independent of the number of interruptions) preferably the sections are elongate stripes that are parallel to each other and vectors that are parallel to each other and along which at least one section is scanned, are substantially perpendicular to a longitudinal direction of the stripe.

BRIEF DESCRIPTION OF THE DRAWINGS

In the following an embodiment of the invention is described with reference to the drawings.

DETAILED DESCRIPTION OF THE EMBODIMENTS

Figure 1:
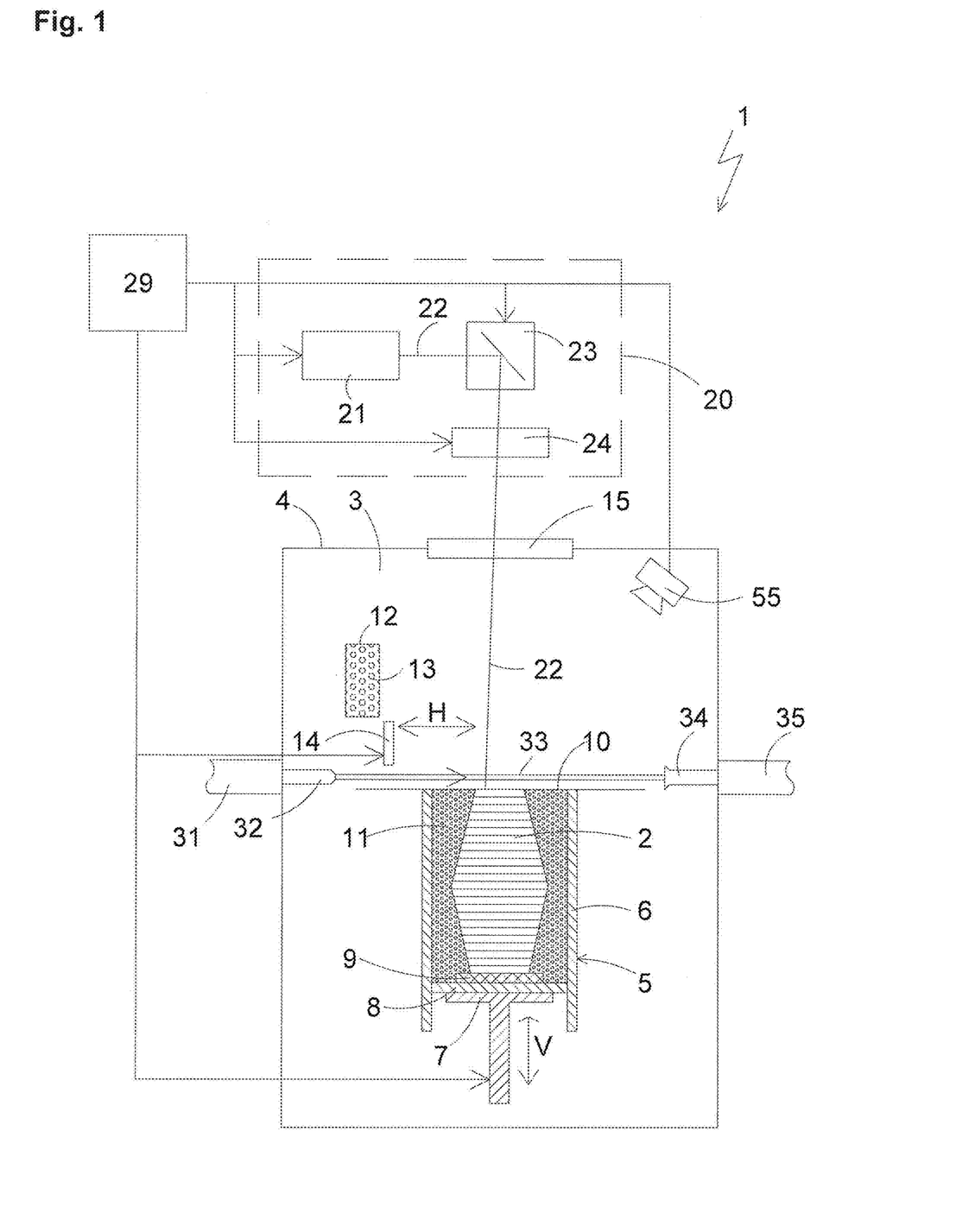
FIG. 1 is a schematic partially sectional view of a device for a layer-wise manufacturing of a three-dimensional object, which device is suitable for implementing the present invention.

In the following a device 1 according to an embodiment of the present invention is described with reference to FIG. 1. The device shown in FIG. 1 is a laser sintering or laser melting device 1. The device comprises a process chamber 3 having a chamber wall 4 for building an object 2.

A container 5, which is open to the top and has a wall 6, is arranged in the process chamber 3. A support 7 that is movable in a vertical direction V is arranged in the container 5. A base plate 8 is arranged at the support 7 and closes the container in a downward direction and thus forms its bottom. The base plate 8 may be a plate formed separately from the support 7 that is attached to the support 7 or it may be formed integrally with the support 7. As is shown in FIG. 1, depending on the powder and the process that are used, a building platform 9 may be additionally attached on the base plate 8, on which building platform the object 2 is built. However, the object 2 may also be built on the base plate 8 itself, which base plate 8 then serves as building platform. In FIG. 1 the object 2 to be formed on the building platform 9 in the container 5 is shown below a working plane 10 in an intermediate state with several solidified layers that are surrounded by building material 11 that remained unsolidified.

Furthermore, the laser sintering device 1 comprises a storage container 12 for a building material 13 in powder form that is solidifiable by electromagnetic radiation and a recoater 14 that can be moved in a horizontal direction H for applying the building material 13 on the working plane 10. The storage container 12 may also be arranged laterally adjacent to the container 5. Moreover, the wall 4 of the process chamber 3 at its top side has a coupling window 15 for the radiation 22 serving for a solidification of the powder 13.

Furthermore, the laser sintering device 1 comprises as scanning unit 20, an exposure device having a laser 21 that generates a laser beam 22, which laser beam 22 can be deflected via a deflection device 23 and can be focused through the coupling window 15 onto the working plane 10 by a focusing device 24.

Moreover, the laser sintering device 1 comprises a control unit 29, by which the individual components of the device 1 can be controlled in a coordinated way for carrying out the building process. The control unit may comprise a CPU, the operation of which is controlled by a computer program (software). The control unit 29 is connected in terms of signalling to a sensor 55, in the present embodiment an optical sensor in the form of a photodiode sensor. The control unit 29 together with the sensor 55 forms an irregularity determination unit, in which based on measurement values of the sensor and/or on other simulation values the (probable) existence of a process irregularity is determined.

Moreover, in order to generate a (preferably substantially laminar) gas flow 33 in the process chamber 3, the laser sintering device 1 comprises a gas supply channel 31, a gas inlet valve 32, a gas exhaustion valve 34 and a gas discharge channel 35. The gas supply channel 31, the gas inlet valve 32, the gas exhaustion valve 34 and the gas discharge channel 35 in the present embodiment form a gas flow channeling unit. Also, the gas supply and the gas discharge may be controlled by the control unit 29. The gas sucked from the process chamber 3 may be supplied to a filtering device (not shown) and the filtered gas can be supplied again to the process chamber 3 via the gas supply channel 31, thereby forming a circulation system with a closed gas circuit. Instead of merely one gas inlet valve 32 and one gas exhaustion valve 34, respectively, also several valves may be provided for each of them.

In operation, at first the support 7 is lowered by an amount that preferably corresponds to the desired layer thickness in order to apply a powder layer. Now, using the recoater 14, a layer of the building material 13 in powder form is applied. Preferably, it is applied over the total build area, which is the part of the working plane 10 inside of the container 5.

Subsequently, the cross-section of the object 2 to be manufactured is scanned (meaning exposed) by the laser beam 22, so that the building material 13 in powder form is solidified at these positions. These steps are repeated until the object 2 is finished and can be removed from the building space. When the three-dimensional object 2 is manufactured by solidifying the building material 11 in powder form, the laser beam 22 locally inputs energy into the building material 11, so that the powder grains sinter with each other or else the powder material 11 is completely melted locally, whereupon the building material 11 solidifies to a solid structure after having cooled down.

During the build-up of the object 2 a gas, preferably a protective gas such as argon and/or nitrogen, is introduced into the process chamber 3 through the gas inlet valve 32 and is again sucked from the process chamber through the gas exhaustion valve 34.

When scanning the portions of a layer that is to be solidified by means of the laser beam 22, at least one break is inserted, i.e. the scanning process is interrupted, based on a process irregularity determined previously (or currently) in an irregularity determination. Here, a break is characterized as time period during the exposure within which the laser beam 22 is interrupted either by switching-off the laser or by directing the laser beam to another position, in particular one outside of the working plane 10. During the interruption of the laser beam 22 also the deflection device 23 may be inactive, so that after the end of the break the laser beam 22 is incident on the powder layer immediately adjacent to the position at which a solidification by means of the laser beam 22 was effected immediately before the break.

With regard to the homogeneity of the obtained parts, the inventive approach has the following advantage:

An example for a process irregularity is the occurrence of splashes (scatters) and smoke and vapors, respectively, or other particles (in the following in each case only smoke is mentioned representatively). During the break such smoke above of the previously exposed position of the powder layer may move away. Therefore, when the exposure is restarted after the break, the solidification process can be continued without the negative impacts of the smoke.

If one did try to lower the scanning velocity of the laser beam in order to overcome the problem of smoke that moves away too slowly, this would result in an increased amount of energy input into the material due to the change of the scanning velocity (as far as the laser power is constant). In laser sintering and similar methods the quantity "aerial energy" in $[J/mm^2]$ is known, which gives the energy received by radiation in Joule per area. From the relation $$\text{aerial energy}[J/mm^2] = \text{laser power}/(\text{scanning velocity} \times \text{hatching distance})$$

it is apparent that with decreasing scanning velocity the aerial energy that is input increases. However, the amount of energy to be input is a difficult control variable. Therefore, the approach according to the invention has the advantage that by the insertion of breaks the input of aerial energy is not changed. In this respect, the hatching distance is understood to be the distance between two adjacent vectors along which vectors the electromagnetic beam is scanned.

The method according to the invention is not only advantageous in view of an impairment of the process accurateness due to the development of smoke. By the insertion of breaks it is also possible to tackle local overheating processes in the part that can be detected by taking into consideration other process irregularities. For example, temperatures at certain positions in the building space can be determined by a direct or indirect temperature measurement, e.g. using a point pyrometer.

Usually, when manufacturing a three-dimensional object, heat that has been introduced locally in order to solidify the powder is dissipated by heat conduction by the already existing partial object. Depending on the "massiveness" of the part the heat dissipation is better or worse. The heat dissipation is worse in particular in filigree structures. Filigree structures are particularly sensitive also because in these structures the "exposure repeating time", i.e. the time until the laser beam returns again to the neighborhood of a currently exposed location, is short. Filigree regions of a part therefore are particularly susceptible to overheating effects. Here, by the insertion of exposure breaks depending on correspondingly determined process irregularities, more time for a dissipation of the heat is provided, so that the danger of a local overheating is reduced.

The length of an exposure break is one or more milliseconds in view of a sufficient escape of smoke, preferably at least 2 ms and/or at most 8 ms. Here, the duration of the break to be specified can be determined depending on the magnitude of the flow velocity of the gas flow 33. If, for example, the flow velocity is at 2 m/s and the duration of the break is at 2 ms, within the break the smoke can move on by a distance having the length $$L = \text{duration of the break} \times \text{flow velocity} = 4 \text{ mm}.$$

When the smoke has such a distance from the position at which the exposure process is continued, the process will no longer be significantly impaired.

In view of the overheating problems a duration of the break of one or more ten milliseconds, preferably at least 10 ms and/or at most 70 ms, more preferably at most 30 ms is advantageous. The length of the duration of the break here depends for example on the "exposure repeating time" already mentioned above.

In principle, the breaks can be introduced as fixed parameter into the exposure procedure. For example, for a presence (also for a predicted presence) of a process irregularity, breaks of a defined length with a pre-defined distance in time with respect to each other may be introduced into the exposure process for a powder layer to be selectively solidified. In such a case the breaks are inserted automatically by the control unit 29, which controls the laser beam 22 and the deflection device 23 and, if necessary, a beam deflection device not shown in FIG. 1 for directing the energy beam away from the build area.

Figure 2:
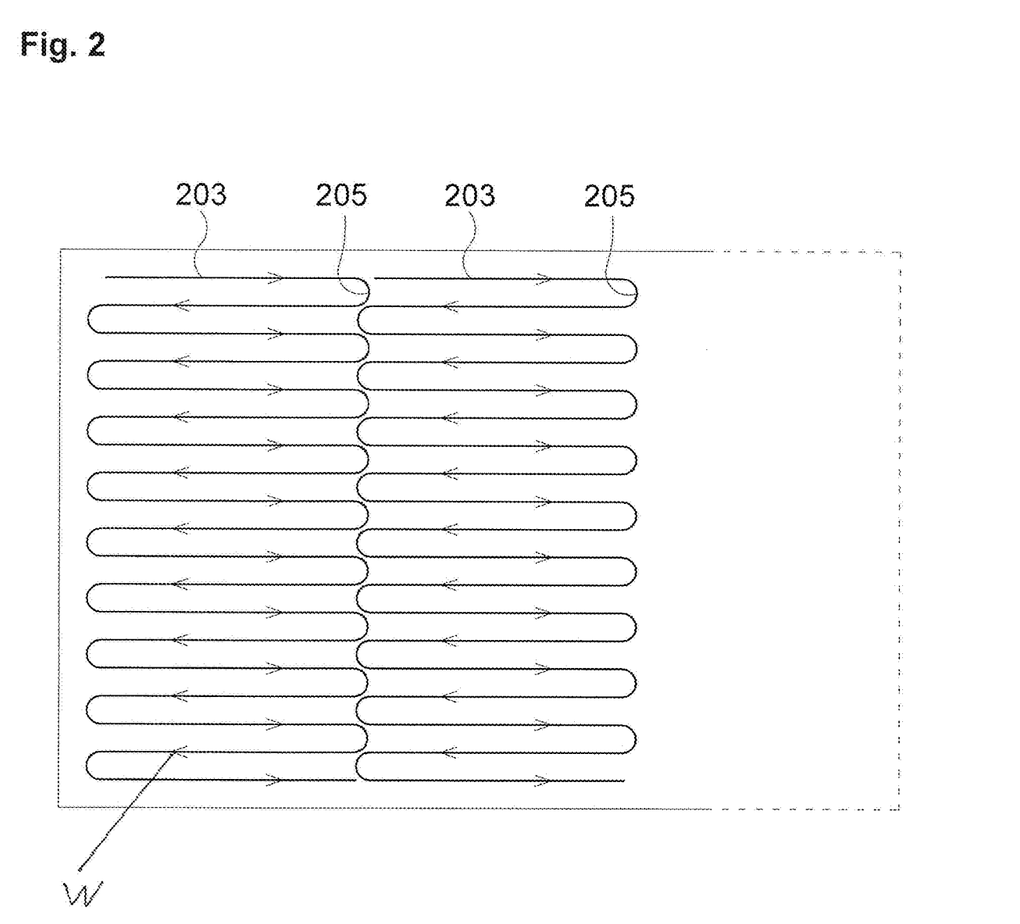
FIG. 2 is a schematic top view of a powder layer to be solidified in the laser sintering device shown in FIG. 1, which schematically shows, how the laser beam is directed across the powder layer in order to solidify the powder.

In the following, based on FIG. 2, a method is presented, in which pre-defined breaks are introduced into the course of the process in a particularly favorable way:

FIG. 2 shows a top view of a portion of a powder layer to be solidified, wherein the portion to be solidified out of simplicity reasons is shown rectangular. In FIG. 2, there are shown two stripe portions 203 adjacent to each other, in which stripe portions the laser beam is moved across the layer in a meandering way. The individual movement lines within a stripe portion 203 that are in parallel to each other, are designated as vectors W here.

Out of reasons of simplicity only two of such stripe portions are shown. In the method described in the following at least a part of the region of a powder layer that is to be solidified shall be covered with such stripe portions 203 that are in parallel to each other, when the region is exposed with a laser beam. Here, the exposure preferably proceeds such that the stripe portions 203 are exposed subsequently in time.

In the boundary region between two adjacent stripe portions 203 a reversal 205 of the direction of movement of the laser beam during the exposure process of a stripe portion 203 is carried out. As for a movement reversal 205 the movement of the deflection mirrors in the deflection device 23 is reversed, the laser beam 22 is switched off in the movement reversal 205. The duration of this switch-off is at approximately 0.3 ms for manufacturing methods that are currently used, wherein the duration of the switch-off depends on boundary parameters of the process and of the device (the bandwidth at the moment lies at 0.1 to 0.6 ms). Therefore, during the movement reversal 205 of the laser beam 22 the duration of the switch-off of the laser may be advantageously simply prolonged, so that the exposure break occurs exactly at the position of the movement reversal 205. As at the mentioned position there is a very short break anyhow, the control effort for the insertion of the additional break according to the invention is not so large.

It shall be pointed out that of course the breaks do not have to occur at each reversal 205 of the movement direction of the laser beam 22 in FIG. 2. Rather, the exposure break may occur also only for each second movement reversal 205, each third movement reversal 205, etc. An upper limit is the total number of movement reversal processes 205 occurring during the exposure of a stripe portion 203.

It shall also be emphasized that the region portions 203 do not necessarily have to be stripe-shaped. Usually, an object cross-section to be solidified will not be rectangularly shaped. If in such a case a region portion 203 borders on the edge of the object cross-section, its shape often will deviate from the shape of a rectangular stripe. Furthermore, also quadratic region portions 203 are in particular also possible. Finally, it is also possible to expose in each case only a small area within a region portion 203 and then continue the exposure in another region portion 203. During the "jump" of the laser beam to the other region portion 203 the break according to the invention can then be inserted.

Though due to the insertion of breaks as described an improvement of the part quality with respect to the surface quality and homogeneity can be observed, nevertheless it has to be taken into consideration that by the breaks of course also the exposure duration for a layer is prolonged and thereby the total manufacturing time for an object is prolonged. Therefore, the exposure breaks according to the invention should be preferably integrated into the exposure procedure only when such breaks are really necessary. In this respect the preferable upper limits in time for the breaks become understandable. In other words, the breaks are intentionally optimized for the process of solidifying the building material in powder form by means of electromagnetic radiation, in particular laser radiation, and are chosen to be correspondingly short. In doing so, in particular the thermal effects and/or the suction effects of the gas flow that is directed over the applied layer, are taken into consideration and advantageously used, respectively.

Here, a first approach is to determine predictively—thus based on prediction models—when and where exposure breaks shall be inserted. For example, based on observations of manufacturing processes in a device for manufacturing a three-dimensional object according to the invention that have already been carried out, it could be determined at which positions above of the working plane 10 process irregularities such as the formation of vortexes in the gas flow 33 occur particularly frequently. Then, exposure breaks would be inserted for the exposure of positions in areas of such a frequent formation of vortexes (or other process irregularities).

A further possibility of gaining a prediction model is a mathematical modeling of the manufacturing process. For example, in a laser sintering method or laser melting method the shape of the object to be manufactured and its location in the powder bed during the manufacturing is known in advance. Therefore, in particular with regard to the process irregularity of a local overheating it can be determined in advance, which positions of the object to be manufactured are particularly susceptible to an overheating. As also the physical properties of the object to be manufactured, in particular the heat conduction properties, are substantially known in advance in case the powder material is known, it can be calculated at which positions heat produced in the manufacturing process will be dissipated particularly poorly by that portion of the object that has already been manufactured. As a result, exposure breaks according to the invention may be inserted in particular when particularly vulnerable object portions (such as filigree object portions) are manufactured. Thus, already before the start of the manufacturing process, the control device 29 can be adjusted such that the exposure breaks are inserted into the building process precisely at the desired positions.

Alternatively or in addition to the insertion of exposure breaks based on prediction models, a control or even a regulation of the exposure process based on real-time information on the course of the process is possible. Here, for example the development of smoke during the exposure process or a local overheating have to be detected and by an insertion of process breaks one has to counteract an excessive smoke development or a local overheating.

Figure 3:
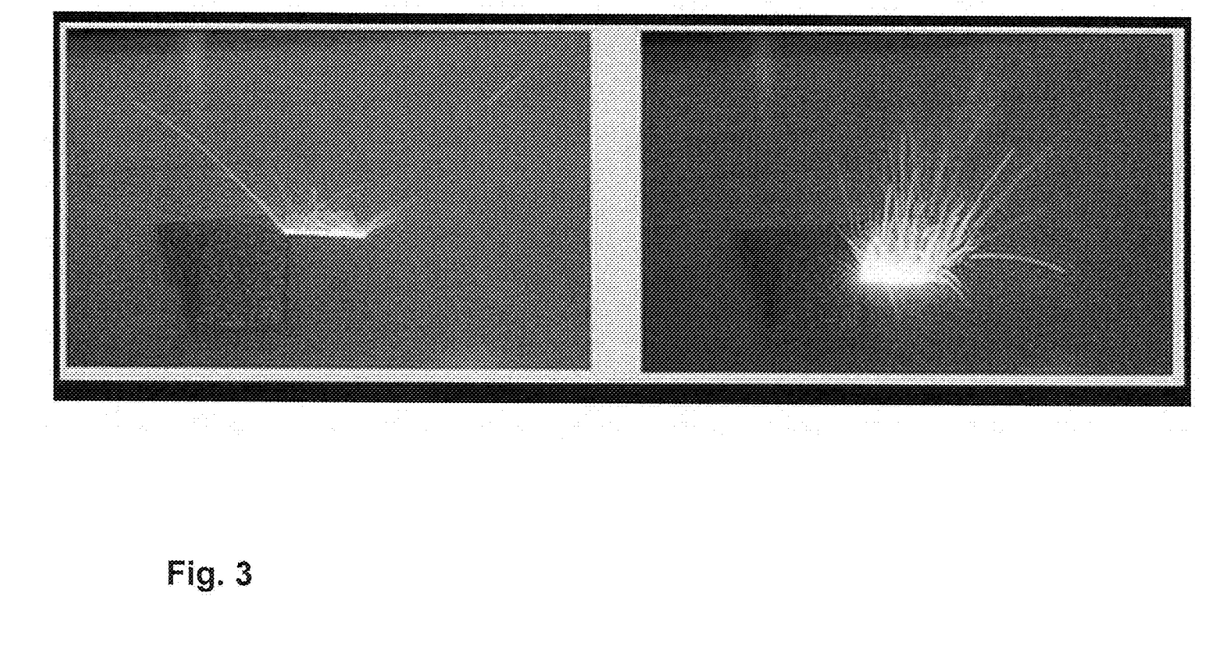
FIG. 3 shows a comparison of the light emissions for a process without development of smoke (left part) and a process with intense development of smoke (right part).

It was observed that an excessive smoke development leads to changes in light emission that normally emanate from a layer area with which the laser currently interacts or with which the laser interacted shortly before ("process light"). FIG. 3 shows a comparison of the light emissions in a process taking place substantially without smoke development (left part) and a process taking place with intense smoke development (right part). It can be seen that the excessive smoke development is accompanied by an increased splashing (scattering).

Therefore, by a monitoring (in particular an optical monitoring) of the interaction region of the laser beam variations of the light emission can be automatically detected and can be used for a decision, whether there shall be a response to this by an insertion of an exposure break or not. For a better understanding it shall be added that the light emission usually comes from the melt pool of powder that has been melted due to the laser interaction. Therefore, the monitoring of the light emissions also is designated as "melt pool monitoring".

The optical monitoring can be implemented for example by means of photodiodes that allow for the high processing velocity in the readout of the optical information. Also other measurement devices may be used, in particular if such measurement devices are able to provide an information on changes of the light emission sufficiently quickly. It turned out that measurements every 30 to 50 microseconds, thus a bandwidth of approximately 30 kHz, lead to a suitable time resolution, which is technically achievable with photodiodes. The photodiodes can be arranged as sensor 55 above of the working plane 10 in the process chamber 3 or else outside of the process chamber. In the latter case there is a coupling into the optical path of the laser beam, so that light radiation can be observed using the same optical path via the deflection device 23 that is also used by the laser beam.

The further processing of the information provided by the light sensors (e.g. photodiodes) can be implemented in a way known to the skilled person. Therefore, it is not described here in detail. For example, by means of a Fourier analysis (e.g. a fast Fourier transformation (FFT)), a wavelet transformation or other methods of mathematical analysis, fast fluctuations of the signal amplitude indicating to a splashy process can be determined. Moreover, also the observation of the signal in the time domain can be used for an assessment of the process. Furthermore, changes of the light emission can also be detected by a short time Fourier transformation in that the change of the frequency spectrum of the signal with time is analyzed. It is important that based on the information provided by the measurement device (thus the sensor), the control device 29 can decide in a time as short as possible (preferably in less than 10 ms, more preferably in less than 1 ms), whether a break shall be inserted in the exposure with the laser beam.

Also a local overheating leads to a change of the light emission. In overheated regions of the object an afterglow (approximately for half a second) occurs, so that more light is emitted when the laser beam acts on powder in overheated regions. Also, above of overheated regions in the underlying layer color changes of the newly applied powder occur.

These color changes may be detected by means of a spectral analysis and/or an analysis of an intensity change of the emitted light. Thus, by an optical analysis of the interaction region of the laser beam it can also be determined in real-time, whether there exist overheated regions.

Figure 4:
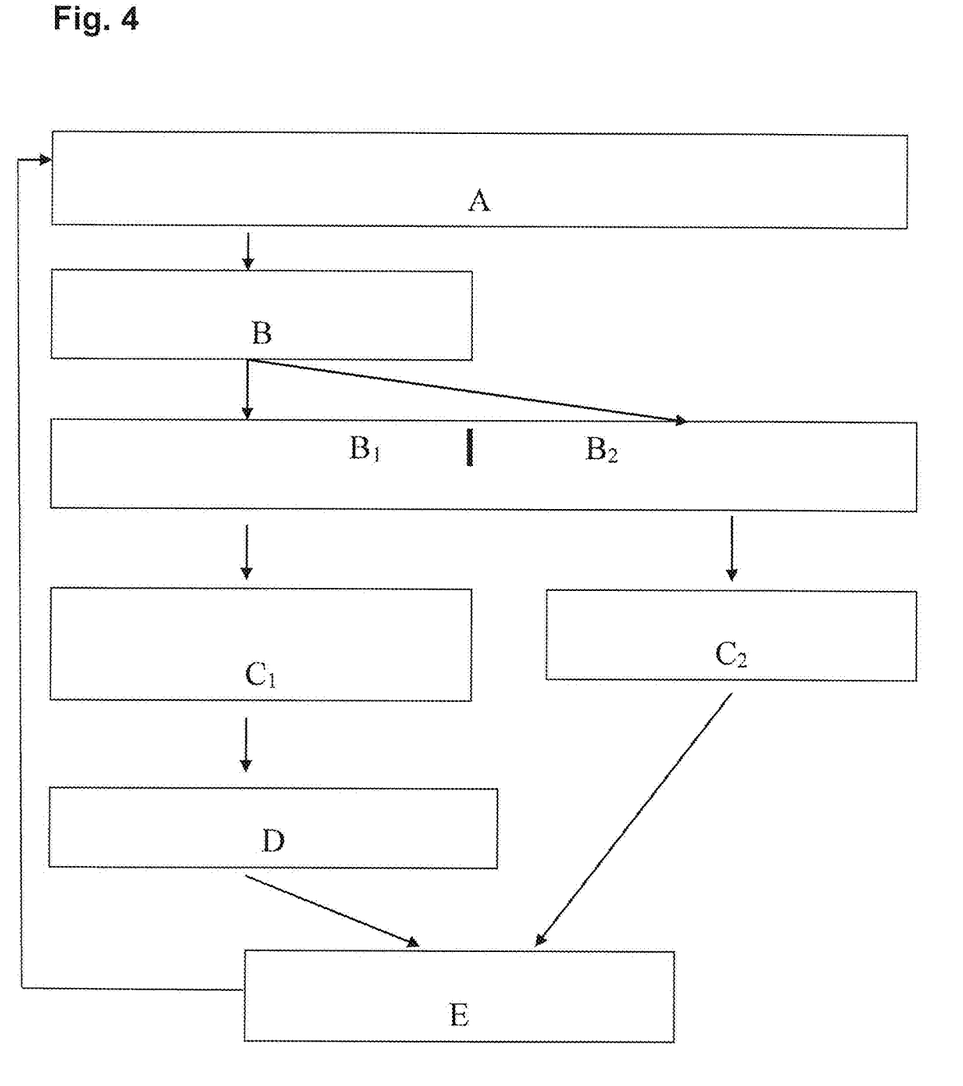
FIG. 4 is a process diagram of an embodiment of a closed loop control according to the invention in a method for a layer-wise manufacturing of a three-dimensional object.

FIG. 4 shows a block diagram for an illustration of an additive manufacturing method, in which a regulation (closed loop control) according to the invention is carried out. Here, it is assumed that it is a manufacturing process in which metal powder is used, wherein a three-dimensional object is generated by selectively melting the powder (also designated as DMLS—Direct Metal Laser Sintering). Thus, in a step A a laser sintering or laser melting method is carried out with a continuous (here optical) monitoring of the process—here the monitoring of the melt pool at the point of incidence of the laser beam. Thus, in order to monitor the manufacturing process, the melt pool at the point of incidence of the laser beam is continuously captured by means of a number of photodiodes and in a step B by means of an analysis of the variations of the light emission/of the spectral distribution a decision is made, whether a process irregularity exists. In case a process irregularity exists, a distinction of cases will be made. Depending on the type of variation of the light emission it is decided, whether according to a first identification $B_1$ smoke development exists as cause for the process irregularity or whether according to a second identification $B_2$ a local overheating exists as cause for the process irregularity.

Then, depending on the type of process irregularity that exists, it is decided what kind of exposure breaks have to be inserted. For example, in the case of $B_1$ (the process irregularity "smoke development"), in a step $C_1$ a sequence of short exposure breaks (2 to 4 milliseconds each) is inserted at each change of direction of the laser beam. Here, the number of exposure breaks in an optional step D may be made dependent on a stop criterion for the insertion of exposure breaks:

For example, the following stop criteria are conceivable:
The optical monitoring detects a termination of the process irregularity.
After a maximum number of exposure breaks has been determined in advance, no further exposure breaks are inserted after this maximum number of exposure breaks has been inserted.
Based on the assumption that in the current powder layer a region to be solidified is exposed in sections (such as stripe-wise as shown in FIG. 2), the insertion of breaks is terminated as soon as the current section (stripe) has been completely exposed.

When the case of $B_2$ ("local overheating") has been determined as process irregularity, it is usually sufficient to insert in a step $C_2$ one longer exposure break (equal to or larger than 10 milliseconds), so that the part may locally cool down.

In each case the manufacturing process is continued in a step E without further exposure breaks after the stop criterion has been reached until again a process irregularity is detected. Of course, it is also possible to insert in the case of the detection of smoke only one longer exposure break of 10 milliseconds or more and to insert in the case of the detection of a local overheating several exposure breaks in succession as described. The maximum number for the exposure breaks to be inserted in succession can for example be a value between 2 and 20. After the exposure of a section (such as the stripe portion 203 shown in FIG. 2) has been completed, preferably no further exposure breaks are inserted.

Moreover, in FIG. 4 a process sequence is shown, in which a process monitoring is carried out with respect to a smoke development as well as with respect to a local overheating. Of course it is also possible that in a simplified process sequence comprising a closed loop control only the smoke development is monitored or a monitoring is carried out only with respect to a local overheating.

The building material in powder form to be used in the method according to the invention can be a plastic powder, ceramic powder or metal powder or mixed powders (e.g. plastic-coated metal powder). However, the method according to the invention is particularly suitable in connection with a metal powder as due to the high temperatures in the building process a smoke development, overheating effects and process light most frequently occur in such case.

When using the above-described closed loop process control, it is not absolutely necessary to resort to two sensors that are sensitive for visible light. Also, the radiation emitted from the position of interaction of the energy beam may be detected in other spectral regions (for example in the infrared).

What is claimed:
1. A method of manufacturing a three-dimensional object through a layer-wise solidification of a building material in powder form using a beam of electromagnetic radiation, comprising the steps:
scanning positions of an applied layer of the building material in powder form that correspond to a cross-section of the object to be manufactured by the electromagnetic beam in order to selectively solidify the building material in powder form;
making an irregularity determination of the existence of a process irregularity with respect to at least one process parameter involved in the manufacture of the object, a process irregularity being at least one of a change of the emission of radiation from a position of interaction of the electromagnetic beam on the building material during the scanning, an overheating of the building material, a high surface roughness of an already solidified portion of the object to be manufactured, color changes of the applied powder layer, and a formation of vortexes in a gas flow; and
making an interruption of scanning at least one current position of the cross-section being solidified in accordance with a timed break as a result of the irregularity determination, and then automatically continuing scanning from the current position after the timed break, wherein the timed break includes a pre-determined length, and
wherein the step of making an interruption of scanning includes interrupting the electromagnetic beam for a time period of at most 70 ms.
2. The method according to claim 1, wherein the step of making the interruption of scanning includes interrupting the electromagnetic beam for a time period of at least 1 ms.
3. The method according to claim 1, wherein the step of making the interruption of scanning includes carrying out a scanning operation at a position other than the current position.
4. A method of manufacturing a three-dimensional object through a layer-wise solidification of a building material in powder form using a beam of electromagnetic radiation, comprising the steps:
scanning positions of an applied layer of the building material in powder form that correspond to a cross-section of the object to be manufactured by the elec- tromagnetic beam in order to selectively solidify the building material in powder form;

making an irregularity determination of the existence of a process irregularity with respect to at least one process parameter involved in the manufacture of the object;

making an interruption of scanning at least one current position of the cross-section being solidified in accordance with a timed break as a result of the irregularity determination, wherein the timed break includes a pre-determined length, wherein the step of making an interruption of scanning includes interrupting the electromagnetic beam for a time period of at most 70 ms; and directing the electromagnetic beam to the position immediately adjacent to the current position, at which current position the interruption was initiated, after completion of the interruption.

5. A method of manufacturing a three-dimensional object through a layer-wise solidification of a building material in powder form using a beam of electromagnetic radiation, comprising the steps:

scanning positions of an applied layer of the building material in powder form that correspond to a cross-section of the object to be manufactured by the electromagnetic beam in order to selectively solidify the building material in powder form;

making an irregularity determination of the existence of a process irregularity with respect to at least one process parameter involved in the manufacture of the object; and making an interruption of scanning at least one current position of the cross-section being solidified in accordance with a timed break as a result of the irregularity determination, wherein the step of making the interruption is triggered depending on information derived from the process irregularity, and the interruption is a time-controlled break depending on information derived from the process irregularity and the step of making an interruption of scanning includes interrupting the electromagnetic beam for a time period of at most 70 ms, and then automatically continuing scanning from the current position after the timed break.

6. The method according to claim 1, wherein the step of making an irregularity determination further includes a detection of an optical emission behavior of respective scanned positions of the layer of the building material in powder form during the scanning with the electromagnetic beam and in which it is determined that a process irregularity exists.

7. The method according to claim 6, wherein the optical emission behavior is determined as being a change of a parameter value of a spectral composition and/or an intensity of a radiation emitted from a scanned position.

8. The method according to claim 7, wherein the change is determined based on threshold values.

9. The method according to claim 1, wherein the region corresponding to the cross-section of the object to be manufactured is divided into sections and is scanned section by section with the electromagnetic beam, wherein the electromagnetic beam in at least one section is moved along vectors that are in parallel to each other, and the electromagnetic beam is interrupted between the scanning of two neighboring vectors.

10. The method according to claim 9, wherein the electromagnetic beam is interrupted several times during the scanning of a section.

11. The method according to claim 9, wherein the sections are elongate stripes that are parallel to each other; and vectors that are parallel to each other and along which at least one section is scanned, are substantially perpendicular to a longitudinal direction of the stripe.

12. A device for manufacturing a three-dimensional object by layer-wise solidification of a building material in powder form using a beam of electromagnetic radiation, the device comprising:

a scanning unit for scanning positions of an applied layer of the building material in powder form corresponding to a cross-section of the object to be manufactured by the electromagnetic beam in order to selectively solidify the building material in powder form, and an irregularity determination unit that carries out an irregularity determination of the existence of a process irregularity with respect to at least one process parameter involved in the manufacture of the object, a process irregularity being at least one of a change of the emission of radiation from a position of interaction of the electromagnetic beam on the building material during the scanning, an overheating of the building material, a high surface roughness of an already solidified portion of the object to be manufactured, color changes of the applied powder layer, and a formation of vortexes in a gas flow, wherein the device is designed such that it interrupts the scanning operation at least one current position of the cross-section being solidified in accordance with a timed break as a result of the irregularity determination, and then automatically continues scanning from the current position after the timed break, wherein the timed break includes a pre-determined length, and wherein the interrupting of the scanning operation includes interrupting the electromagnetic beam for a time period of at most 70 ms.

13. Control unit for a device for manufacturing a three-dimensional object by layer-wise solidification of a building material in powder form using a beam of electromagnetic radiation, the device comprising:

a scanning unit for scanning positions of an applied layer of the building material in powder form corresponding to a cross-section of the object to be manufactured by the electromagnetic beam in order to selectively solidify the building material in powder form; and an irregularity determination unit that carries out an irregularity determination of the existence of a process irregularity with respect to at least one process parameter involved in the manufacture of the object, a process irregularity being at least one of a change of the emission of radiation from a position of interaction of the electromagnetic beam on the building material during the scanning, an overheating of the building material, a high surface roughness of an already solidified portion of the object to be manufactured, color changes of the applied powder layer, and a formation of vortexes in a gas flow, wherein the control unit is designed such that it interrupts the scanning operation at least one current position of the cross-section being solidified in accordance with a timed break as a result of the irregularity determination, and then automatically continues scanning from the current position after the timed break, wherein the timed break includes a pre-determined length, and wherein the interrupting of the scanning operation includes interrupting the electromagnetic beam for a time period of at most 70 ms.

14. A non-transitory computer-readable medium storing a computer program that controls a device for manufacturing a three-dimensional object through a layer-wise solidification of a building material in powder form using a beam of electromagnetic radiation, the computer program having program code for carrying out the following steps when the computer program is executed in the device:

scanning positions of an applied layer of the building material in powder form that correspond to a cross-section of the object to be manufactured by the electromagnetic beam in order to selectively solidify the building material in powder form;

making an irregularity determination of the existence of a process irregularity with respect to at least one process parameter involved in the manufacture of the object, a process irregularity being at least one of a change of the emission of radiation from a position of interaction of the electromagnetic beam on the building material during the scanning, an overheating of the building material, a high surface roughness of an already solidified portion of the object to be manufactured, color changes of the applied powder layer, and a formation of vortexes in a gas flow; and making an interruption of scanning at least one current position of the cross-section being solidified in accordance with a timed break as a result of the irregularity determination, and then automatically continuing scanning from the current position after the timed break, wherein the timed break includes a pre-determined length, and wherein the step of making an interruption of scanning includes interrupting the electromagnetic beam for a time period of at most 70 ms.

15. The method of claim 1, further including the step of passing a gas flow over the applied layer during scanning.

16. The method of claim 7, wherein the spectral composition is visible and/or near-infrared light.

* * * * *